United States Patent
Schönleben et al.

(10) Patent No.: US 10,013,163 B2
(45) Date of Patent: Jul. 3, 2018

(54) METHOD AND DEVICE FOR TYPING ON MOBILE COMPUTING DEVICES

(71) Applicants: Oliver Schönleben, Nürnberg (DE); Antti Oulasvirta, Saarbrücken (DE); Daniel Buschek, München (DE)

(72) Inventors: Oliver Schönleben, Nürnberg (DE); Antti Oulasvirta, Saarbrücken (DE); Daniel Buschek, München (DE)

(*) Notice: Subject to any disclaimer, the term of this patent is extended or adjusted under 35 U.S.C. 154(b) by 472 days.

(21) Appl. No.: 14/443,130

(22) PCT Filed: Nov. 15, 2013

(86) PCT No.: PCT/EP2013/073987
§ 371 (c)(1),
(2) Date: May 15, 2015

(87) PCT Pub. No.: WO2014/076258
PCT Pub. Date: May 22, 2014

(65) Prior Publication Data
US 2015/0293695 A1 Oct. 15, 2015

Related U.S. Application Data

(60) Provisional application No. 61/726,690, filed on Nov. 15, 2012.

(51) Int. Cl.
*G06F 3/0488* (2013.01)
*G06F 3/0484* (2013.01)
(Continued)

(52) U.S. Cl.
CPC ........ *G06F 3/04886* (2013.01); *G06F 3/0412* (2013.01); *G06F 3/04817* (2013.01);
(Continued)

(58) Field of Classification Search
CPC ............. G06F 3/04886; G06F 3/04817; G06F 3/0412; G06F 3/04842; G06F 2203/04803; G06F 2203/04104
See application file for complete search history.

(56) References Cited

U.S. PATENT DOCUMENTS 8,554,287 B1 * 10/2013 Rao .................. G06F 21/32
361/679.55
2005/0104855 A1   5/2005 Grossmeyer
(Continued)

FOREIGN PATENT DOCUMENTS

WO      2012001432 A1    1/2012
WO   WO2012/001432    *  1/2012 ............... G06F 3/02

OTHER PUBLICATIONS

International Search Report and Written Opinion dated May 15, 2015 from Int'l Appl. No. PCT/EP2013/073987.
(Continued)

*Primary Examiner* — Andrew Sasinowski
(74) *Attorney, Agent, or Firm* — James E. Walton

(57) ABSTRACT

The present invention relates to a method and a mobile computing device for reliable and fast text entry. The method relies on a virtual keyboard layout that has a multi-touch interaction surface spread out on both the front and rear sides of a handheld computing device. A user-adaptive updating algorithm allows the virtual keyboard layout to adapt to the user's handling of the device.

21 Claims, 3 Drawing Sheets

(51) Int. Cl.
*G06F 3/041* (2006.01)
*G06F 3/0481* (2013.01)
(52) U.S. Cl.
CPC ............... *G06F 3/04842* (2013.01); *G06F 2203/04104* (2013.01); *G06F 2203/04803* (2013.01)

(56) References Cited

U.S. PATENT DOCUMENTS

| | | | |
|---|---|---|---|
| 2010/0064212 A1 | 3/2010 | Snyder | |
| 2010/0259561 A1* | 10/2010 | Forutanpour | G06F 3/0216 345/660 |
| 2011/0157055 A1 | 6/2011 | Tilley et al. | |
| 2011/0193782 A1 | 8/2011 | Shiu et al. | |
| 2012/0007822 A1 | 1/2012 | Luo | |
| 2013/0268879 A1* | 10/2013 | Zhang | G06F 3/0418 715/773 |

OTHER PUBLICATIONS

International Preliminary Report on Patentability dated May 19, 2015 from Int'l Appl. No. PCT/EP2013/073987.
International Search Report dated Feb. 6, 2014 from Int'l Appl. No. PCT/EP2013/073987.

\* cited by examiner

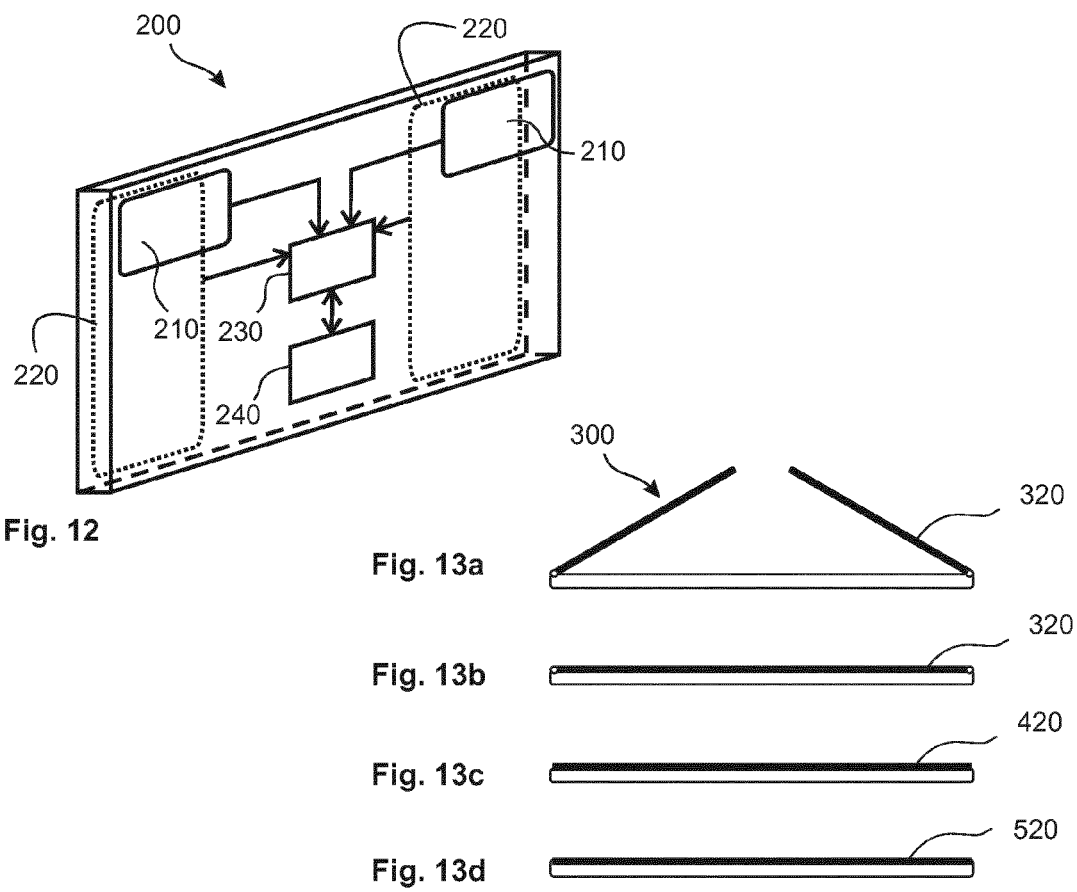
Fig. 12
Fig. 13a
Fig. 13b
Fig. 13c
Fig. 13d
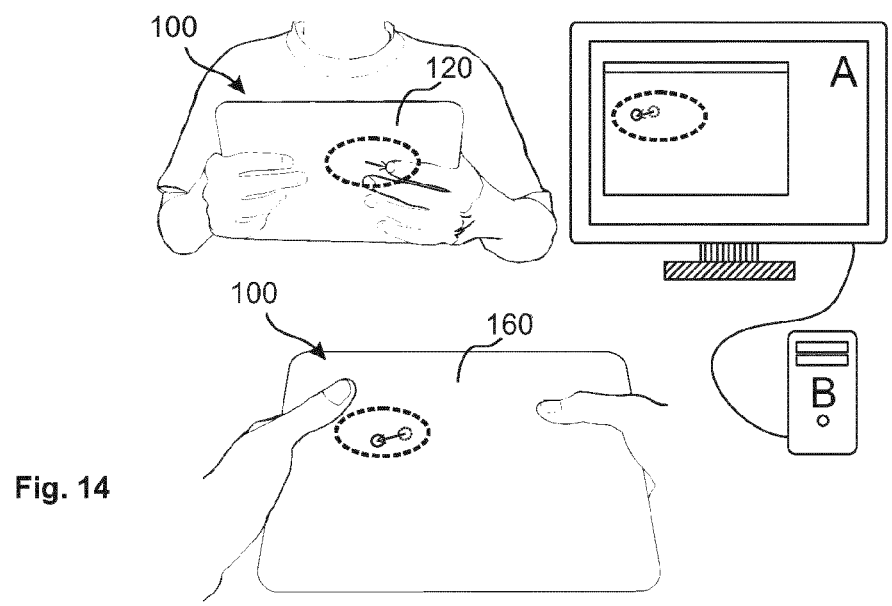
Fig. 14

METHOD AND DEVICE FOR TYPING ON MOBILE COMPUTING DEVICES

TECHNICAL FIELD

The present invention relates to a method for providing touch input at a handheld or mobile computing device. More specifically, it relates to a method, which enables a user of such a device to hold the device while clasping it along its edges with both hands, while providing touch input on the front and rear faces of the device. The invention further relates to a device for implementing the disclosed method.

BACKGROUND OF THE INVENTION

On desktop computers, text is usually entered by typing on physical keyboards that roughly generate one character on the press of a key. The keyboard layout determines which character is generated by the press of which key. Prominent examples are the QWERTY layout and the Dvorak Standard Keyboard Layout, DSK. The alphabetic part of a conventional keyboard is divided into three rows: a top row, a home row and a bottom row. Letter keys, when pressed, produce textual input, usually a lowercase letter. Modifier keys are designated keys on the keyboard that modify the input in some predetermined way. For example, the Shift modifier, when pressed together with a letter key, usually produces an uppercase letter, rather than a lowercase latter. The Alt modifier may produce letters of an alternative alphabet (e.g. Greek instead of Latin), graphical or mathematical symbols, and other kinds of symbolic input. Touch typing refers to a technique of typing that systematically deploys 9-10 fingers at once and enables eyes-free typing, i.e. entering text without having to look at the keyboard.

Touch panels are often integrated into display screens and interpret touches of a user, thus generating information that can be processed by a software and electronic circuit of a computing device. Multi-touch refers to the property of such a touch panel to interpret and distinguish multiple separate touches, e.g. from several fingers, simultaneously.

In mobile computing devices with touch panels, such as smartphones and tablet computers, low text entry rates are a recognized interaction bottleneck. In state of the art devices, separate touches can be robustly detected and distinguished from each other, and the parameters of each touch are cleanly reported to software components, which interpret them. On touch aware mobile devices, text is usually entered as the user presses virtual buttons that are drawn on the screen, so that they resemble a miniature keyboard, which is commonly called virtual keyboard or on-screen keyboard, as the operating surface is also the touch panel. Virtual keyboards commonly sport the QWERTY keyboard layout. Typing on such software keyboards typically suffers from slow entry rates, high error rates and provides a generally tedious and frustrating experience.

Mobile computing devices, such as large smartphones and tablet computers are typically equipped with a multi-touch capable display unit, which enables text entry directly on the screen of the display unit. Several studies have shown that such devices are primarily used for data consumption, such as web browsing, consuming digital media or gaming. For productive use cases, users generally turn to laptop or desktop computers. One of the reasons to this appears to be the difficulty to enter text on such mobile devices. While a user tends to hold a tablet computer by firmly clasping it along its lateral edges to look at the screen of the device, this position is in general ill-suited for on-screen text entry. To enter text, the device typically has to be brought into a stable position, which enables the fingers of both hands to touch the screen. The screen is used to display both an on-screen software keyboard, and the application into which the text should be entered. Such as setup reduces the effective size of the screen that is available for displaying the application.

It is known to use peripheral external keyboard devices that connect to a mobile computing device. Such peripheral devices connect for example by Universal Serial Bus, USB, or wireless channels, such as Bluetooth™ technology. While the use of an external keyboard allows for efficient text entry into tablet computers, it breaks the mobile form factor.

It is known to attach a physical keyboard to the back of a mobile computing device. This allows a user to hold the computing device with both hands and to use the keyboard with the fingers that would usually rest on the rear face of the device. The rows of a typical desktop keyboard are split and located on the left and right parts of the rear face of the mobile computing device. The finger-to-key mapping of a regular desktop keyboard is maintained by the arrangement of such a folded keyboard. However, the form factor of the device is significantly altered, learning to use such a keyboard is often hard, as the user has to adapt to the input device. To our knowledge, all of the known text entry solutions that retain the mobile form factor of a mobile computing device, exhibit typing rates, even after prolonged learning phases, that are significantly lower than the typing rates achieved by trained typist on traditional desktop keyboards, which are of the order of 50-60 words per minute, wpm.

TECHNICAL PROBLEM TO BE SOLVED

It is an objective of the present invention to provide a method that enables touch input at a handheld computing device, which makes use of a multi-touch sensing element provided on the rear face of the computing device to enter input elements such as text elements into the device, and which overcomes at least some of the disadvantages of the prior art.

SUMMARY OF THE INVENTION

According to a first aspect of the invention, there is provided a method for providing touch input at a handheld computing device. The device is provided with at least one touch multi-touch sensing means on its front face, and with at least one multi-touch sensing means on its rear face. The multi-touch sensing means may comprise a single multi-touch sensor element, or a plurality of single touch sensor elements, preferably arranged as an array. The method comprises the steps of providing, at the device, a virtual keyboard layout, which maps at least one first target area of said rear face multi-touch sensing means to a first predetermined input element, and at least one second target area of said front face multi-touch sensing means to a second predetermined input element;

detecting, at the device, the location of at least one touch event on said multi-touch sensing means;

determining, at the device, a likely target area of said touch event on the virtual keyboard layout;

storing, at the device, the detected touch event location and the corresponding determined target area;

updating the virtual keyboard layout, wherein the location or shape of said area is adapted based on the detected touch event location.

The virtual keyboard layout does not encompass the graphical representation of the target area-to-input element mapping. A plurality of distinct target areas may be mapped to the same input element. Vice-versa, touching plurality of distinct target areas may be required to select a single input element.

According to another aspect of the invention, there is provided a method for providing touch input at a computing device. The device is provided with at least one touch multi-touch sensing means on its front or rear face. The multi-touch sensing means may comprise a single multi-touch sensor element, or a plurality of single touch sensor elements, preferably arranged as an array. The method comprises the steps of
- providing, at the device, a virtual keyboard layout, which maps at least one first target area of said rear or front multi-touch sensing means to a predetermined input element;
- detecting, at the device, the location of at least one touch event on said multi-touch sensing means;
- determining, at the device, a likely target area of said touch event on the virtual keyboard layout;
- storing, at the device, the detected touch event location and the corresponding determined target area;
- updating the virtual keyboard layout, wherein the location or shape of said area is adapted based on the detected touch event location.

Preferably, the method may further comprise the following steps:
- associating regions of said front and rear face multi-touch sensing means with specific fingers of a user;
- providing, for said virtual keyboard layout, a finger-to-key mapping which assigns a user's finger to a set of target areas on the multi-touch sensing means;

Further, said determination step may further comprise:
- determining which finger generated the touch event, based on the proximity of the detected touch event location to said regions;
- determining, among the set of target areas which are mapped to the determined finger, a likely target area of said touch event on the virtual keyboard layout.

Said determination step may preferably comprise selecting the target area of the virtual keyboard layout, whose centroid location has the shortest Euclidian distance to the detected touch event location.

Further preferably, said determination step may comprise selecting the target area of the virtual keyboard layout based on its likelihood, wherein said likelihood is a function of the Euclidian distance between the target area's centroid location and the location of the detected touch event.

The likelihood of a target area may further be a function of the number of occurrences in which the target area has been previously determined given previous touch events on said location. Furthermore, the likelihood may be a function of the target area's associated input element's probability of occurrence given previously determined target areas. Such probability may for example be provided by a language model in case the predetermined input element is a text character, n-gram or word.

Said updating step may preferably comprise moving the location of the determined target area towards the detected touch event location.

The updating step may further preferably comprise moving the location of the determined target area toward the centroid of all or part of the previously detected and stored touch event locations, for which the same target area has been determined. The centroid of a set of touch locations is defined as per usual as the mean position of all the touch locations in the set, in both coordinate directions.

The device may further comprise display means on its front face, and the method may preferably comprise the step of selectively displaying a representation of the virtual keyboard layout corresponding to the rear multi-touch sensing means at said front display means. The method may further preferably comprise the step of selectively displaying a representation of a detected touch location on the rear multi-touch sensing means at the front display means.

The virtual keyboard layout may advantageously map a set of target areas on the left and right sides of the rear face of the device to text character elements, so as to provide a folded keyboard layout, which can be touched using fingers of the left and right hands respectively.

The detected touch events may preferably comprise touch "Up", touch "Down", or touch gesture events.

The method may further comprise the step of providing the associated predetermined input element into an input memory buffer of the device, after the target area has been determined.

The steps according to the method may advantageously be repeated to adapt the location of said target areas to a user's handling of the device.

According to a further aspect of the invention, a handheld computing device is provided. The device comprises at least one multi-touch sensing means on its front face, and at least one multi-touch sensing means on its rear face. The device further comprises a memory element and computing means. The computing means and memory element are configured for:
- providing, a virtual keyboard layout, which maps at least one first target area of said rear face multi-touch sensing means to a first predetermined input element, and at least one second target area of said front face multi-touch sensing means to a second predetermined input element;
- detecting, the location of at least one touch event on said multi-touch sensing means;
- determining, a likely target area of said touch event on the virtual keyboard layout;
- storing, the detected touch event location and the corresponding determined target area in said memory element;
- updating the virtual keyboard layout, wherein the location or shape of said area is adapted based on the detected touch event location, and storing said updated virtual keyboard layout.

The computing means may further be configured for:
- associating regions of said front and rear face multi-touch sensing means with specific fingers of a user;
- providing, for said virtual keyboard layout, a finger-to-key mapping which assigns a user's finger to a set of target areas on the multi-touch sensing means;
and for executing the following further steps during said determination step:
- determining which finger generated the touch event, based on the proximity of the detected touch event location to said regions;
- determining, among the set of target areas which are mapped to the determined finger, a likely target area of said touch event on the virtual keyboard layout.

The computing means may further be configured to perform the additional steps according to any of the previously described method steps.

The device may further comprise a display on its front face, with which said front multi-touch sensing means are collocated. Preferably, the device may be a tablet computer.

Said multi-touch sensing means may preferably be removably attached to said device.

The rear multi-touch sensing means may preferably be arranged substantially along the lateral edges of the device, and extend towards the middle of the rear face.

Alternatively, the rear multi-touch sensing means may cover substantially all of the rear face.

According to a further aspect of the invention, there is provided a computer capable of carrying out the method according to the invention.

According to yet another aspect of the invention, there is provided a computer program comprising computer readable code means, which, when run on a computer, causes the computer to carry out the method according to the invention.

According to a last aspect of the invention, there is provided a computer program product comprising a computer-readable medium on which the computer program according to the invention is stored.

By using the method and device according to the present invention, tests have shown that typing rates of 64% of the desktop keyboard's rates after 8 hours of training can be achieved, which is a significant improvement as compared to state of the art text entry methods for handheld computing devices. The high typing rates are achieved mainly by fast tapping (i.e. touching and releasing the multi-touch sensor surface), which mimics the behavior of a physical keyboard and reduces the learning curve. The mobile form factor of the handheld device is maintained while a user types, as the typing is performed while the device is firmly clasped with both hands. This maximizes at the same time the interaction area between the user and the handheld device. Fast typing is possible while walking, sedentary, or laying down, thus enabling all common mobile use cases.

The method according to the invention is designed to be flexible and adapts to the user's hand anatomy and typing behavior. Since handheld computing devices, such as tablets, are generally not shaped to be held ergonomically while typing, this adaptation is key to work efficiency and for user adoption. The method can also detect its user by comparing their touch behavior with stored user touch models in its database.

Screen real-estate occlusion is avoided by transferring the keyboard interaction surface mainly to the rear part of the device. Once the user knows where the keys are located (i.e. he uses the same fingers for the same keys as on a conventional physical keyboard), eyes-free touch-typing is rendered possible. All screen real-estate is saved for the running application. If visual feedback is required, then a virtual keyboard is shown as a temporary visible and preferably partially transparent overlay on a display unit connected to the computing device.

Typing novices can learn the typing technique using an app running on the tablet. On a regular training routine, they achieved 9 wpm after 1 hour, and 11 wpm after 2 hours of training. Novices are not tied to a certain keyboard (like QWERTY), and can be presented an optimized keyboard (e.g., DSK) from the start.

The software-driven method can evolve to become even more efficient without negative short-term impact for the performance, e.g., by gradually changing the keyboard layout key-to-letter mapping, introducing multi-letter actions, or change the system to resemble any other optimal strategy, even chording.

Multi-touch panels are inexpensive hardware components, which enables the production of devices on which the method can be run at a low economic overhead, while increasing the productivity of their users.

BRIEF DESCRIPTION OF THE DRAWINGS

Several embodiments of the present invention are illustrated by way of figures, which do not limit the scope of the invention, wherein:

FIG. 12 schematically illustrates a preferred embodiment of the device according to the invention.

FIGS. 13a, b, c and d illustrate top views of preferred embodiments of the device according to the invention, in conjunction with a known tablet computing device.

FIG. 14 illustrates how a touch event on a rear touch sensing means is mapped to a front screen of the device according to a preferred embodiment of the invention, or to an external display means.

DETAILED DESCRIPTION OF THE INVENTION

Figure 1A:
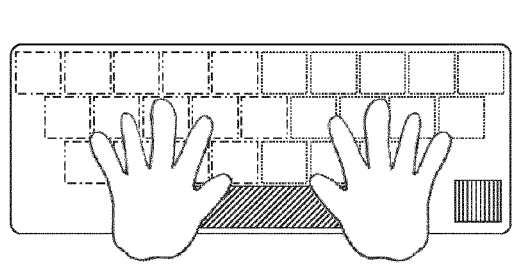
FIG. 1a is an illustration of a known on-screen keyboard.

This section describes the invention in further detail based on preferred embodiments and on the figures. Unless stated otherwise, similar reference numbers will be used to denote similar concepts across different embodiments of the invention. For example, reference numerals 100, 200 and 300 will be used to denote a device according to the present invention in three different embodiments.

The embodiments presented herein should allow the skilled person to understand and implement the method and device according to the present invention. Features described for a specific embodiment are applicable to all embodiments according to the present invention, unless stated otherwise.

Figure 1B:
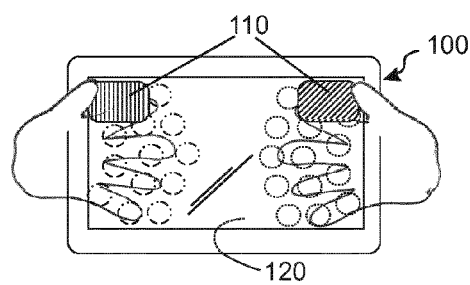
FIG. 1b illustrates a front view of a preferred embodiment of the device according to a preferred embodiment of the present invention, as held by a user.
Figure 2:
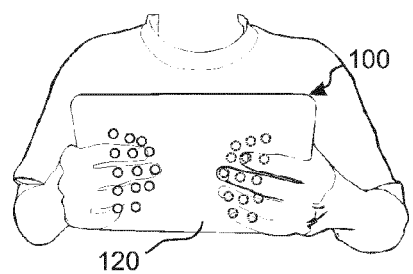
FIG. 2 illustrates a rear view of a preferred embodiment of the device according to a preferred embodiment of the present invention, as held by a user.
Figure 3:
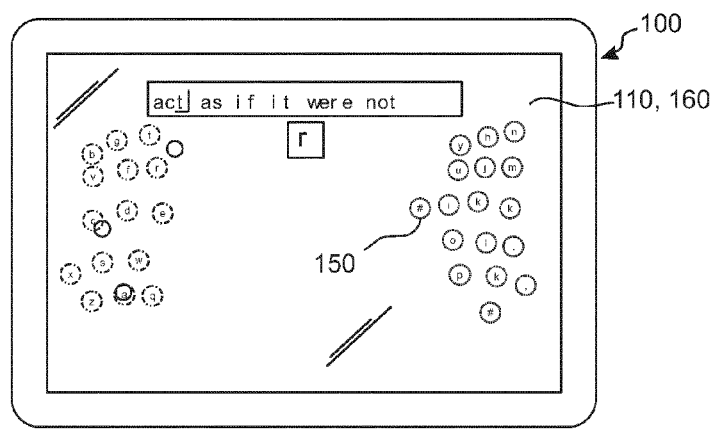
FIG. 3 illustrate a front view of a device according to a preferred embodiment of the present invention, including visual feedback of a virtual keyboard layout mapping.

FIG. 1a shows a state of the art on-screen keyboard of a computing device, such as a tablet computer. The arrangement of the virtual keys that are displayed mirrors the known arrangement on hardware keyboards. In order to efficiently and quickly type on such a keyboard with both hands, the tablet device must be supported, for example by a table. FIG. 1b conceptually shows the interaction achieved by using the method and device according to the present invention. A handheld computing device 100, such as a tablet computer or a smartphone, is held with both of the user's hands. The user firmly clasps the device along its lateral edges. In that position, the mobility of both the user and the device is maintained as the device does not need to be laid down. The user's thumbs naturally rest on the front face of the device, which is equipped with a multi touch sensor 110 at least in those areas on which the thumbs are resting. The remaining four fingers of each hand naturally rest on, or hover over the rear face of the device, which is equipped with a multi-touch sensor 120 at least in those areas on which theses fingers are resting. The method and device according to the present invention enable the user to enter text and provide further input elements into the device in the position depicted in FIG. 1b. The interaction with the device is enabled using the multi-touch sensing elements 110, 120. Touches on these sensing elements are interpreted as keystrokes or other input elements, depending on the context of the user interaction. Moreover, the method according to the invention adapts the specific virtual keyboard that is being used, i.e. the mapping that associates areas of the multi-touch sensors 110, 120 to virtual keys or target areas, to the user while he is using the device. The adaptation may be done by moving the virtual keys to locations that are actually hit by the user's fingers, or by changing the size of virtual keys to enable the user to hit the virtual keys with higher probability. By learning the user's handling of the device, the method allows to achieve high typing rates, low error rates, and ergonomically adapts to the position of the user's hands. FIG. 2 provides a further illustration of how the device 100 is held by a user, wherein the virtual keys are depicted by circles for the sake of clarity. FIG. 3 provides an illustration of a graphical user interface comprising a text entry box. The front display 160 of the tablet device 100 is used to selectively display, as an overlay to the graphical user interface, a graphical representation 150 of the virtual keyboard layout that maps areas on the rear face multi-touch sensors of the device, shown as circles, to specific letters, depicted within the corresponding circles. The visual feedback provided on the display may approximate current key locations, in any form suitable to reflect the important properties of said key. The feedback may further comprise visualization of touch data, e.g. visualizations on the front screen of a tablet, that correspond to the locations of occurring touches on the rear side touch sensors. Furthermore, the graphical representation 150 of the virtual keyboard may be used to highlight specific keys (e.g. by showing them in a certain color, or by showing their size exaggerated) that might be favored by the user in the current application context.

Figure 4:
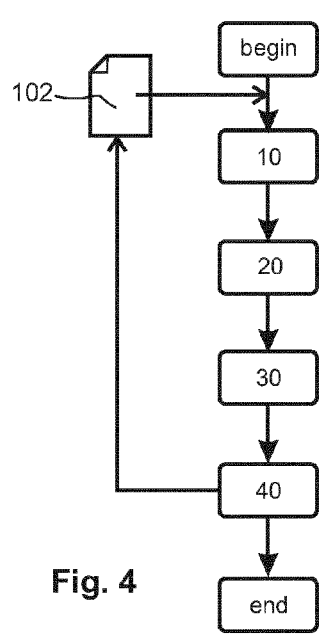
FIG. 4 is a flow diagram illustrating the main method steps according to a preferred embodiment of the invention.

FIG. 4 is a flow chart which illustrates the main steps of a preferred embodiment of the method according to the invention. The method provides a way to enter input elements into a handheld computing device, such as for example a tablet computer or a smartphone, by way of at least one multi-touch sensing means on its front face and at least one multi-touch sensing means on its rear face. The method is equally applicable to worn touch-sensing interfaces, and such sensors placed on physical objects.

A virtual keyboard layout, 102, which defines a mapping between at least one first target area of said rear face multi-touch sensing means to a first predetermined input element, and at least one second target area of said front face multi-touch sensing means to a second predetermined input element, is provided. The mapping is preferably stored on a memory element of the device, and is preferably selected among a plurality of stored mappings by a user.

Preferably, a plurality of target areas or virtual keys on the rear face multi-touch sensing means are mapped to the letters of the alphabet, such as to provide a keyboard that enables text entry. However, other input elements such as symbols, words or control events may equally be mapped to any of the virtual keys. In a preferred embodiment, the front face multi-touch sensing means comprises target areas which are mapped to any of the Spacebar key, the Shift modifier or any other keyboard modifier.

During a first step 10, the location of at least one touch event is detected on said multi-touch sensing means, either on the front or on the rear face of the device. During a second step 20, a likely target area, or virtual key, of the detected touch event is determined. The detected touch event location and the corresponding determined target is stored in a memory element of the device, preferably in an array structure or a database, for future retrieval. This corresponds to step 30. During an updating step, 40, the virtual keyboard layout is adapted by potentially changing the location and/or the shape of the target area that has been determined, by taking into account the location of the detected touch event. The updated virtual keyboard layout 102 is stored and it will be used during a subsequent interaction of the user with the multi-touch sensor, in order to determine the target area that was most likely intended to be hit. By iteratively adapting the size and location of the target areas or virtual keys, the keyboard is adapted to the user and not vice-versa, resulting in more efficient and less error-prone entry of the input elements into the computing device.

This describes the principle underlying the invention in general terms. Further details will be provided in the following description of further embodiments.

In a preferred embodiment of the invention, the intended target area of a detected touch event is selected as the target area whose centroid location has the shortest Euclidian distance to the location of the detected touch event.

Whenever a touch event is detected, its intended target key is computed as the key with the smallest computed Euclidean distance to said touch location. In other words, if the location of the touch event is given by the coordinates tx, ty with respect to the touch sensor on which the touch has been detected, and kx, ky are the coordinates of the centroid of a target area k within a set K of available target areas, then the closest key to the touch event is evaluate by Eucl(k,t): $=\mathrm{argmin}_{(k \in K)} ((kx-tx)^2+(ky-ty)^2)^{0.6}$. Thus, for each possible touch location (x,y) on the backside touch panel, there is exactly one key target assigned to (x,y).

Optionally, a maximum Euclidean distance between the touch location t and a target area or key k can be demanded, which results in areas not assigned to any key. In that case, the recognizer can ignore the touch, or consult another means of key determination as described further here below.

A plausibility measure, may preferably be computed to express the degree of "certainty" to which the virtual key k can be determined. In the simplest case, plausibility or likelihood is an inverse of Eucl(k,t); additionally, distances to other keys can be stored, and computed into the measure. The most likely intended keys or target areas are stored and the determination is further refined among these, using for example a language model as described further below. It is possible, that a language model, given a pre-selection of likely keys, will select another key k than the one key with the smallest Euclidean distance, k'; in that case, not k' is adapted, but either the key k will be adapted, or no key will be adapted.

The adaptation step is performed so that the virtual keyboard layout better matches the current typing behavior of the user. Adaptation is for example done as follows:

Be k=(x, y) a key to be adapted to a touch t, where t.loc=(tx, ty) is the location of a touch event. Adaptation of k means that k is replaced by k':=k+c(t.loc−k)=(k.x+c (t.loc.tx−k.x), k.y+c(t.loc.ty−k.y)).

Positive values for c mean a movement "toward" the touch, whereas negative values effect a movement "away from" it. Generally, it should be c<1 (c=1 would lead to relocation of the key exactly onto the touch). Values for c can alter during typing, e.g., higher values for c might be suitable for the typing behavior after a session starts, (esp. during a calibration), and lower values might suit better the case during a typing session for certain users.

Figure 5A:
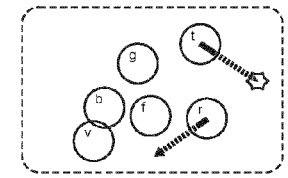
FIGS. 5a, 5b and 5c illustrate a key updating step according to a preferred embodiment of the invention.
Figure 5B:
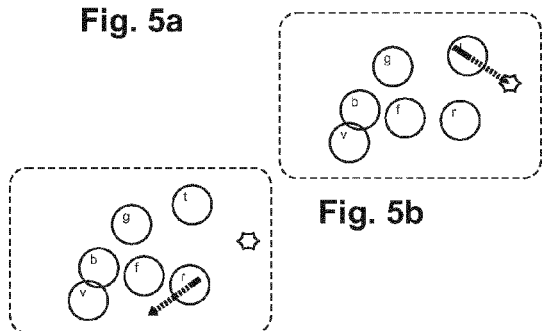
Figure 5C:
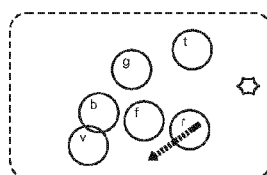

FIG. 5a shows a situation in which the key "t" was intended to be hit, but the detected touch, indicated by a star shape, is closer to the target area corresponding to the input element "r". As shown in FIG. 5b, the intended target are "t" may be moved towards the location of the detected touch while the area corresponding to input element "r" remains in place. Alternatively, or complementary to this adjustment, the area corresponding to input element "r" may be moved away from the detected touch location to resolve possible cluttering of target areas. This is illustrated by FIG. 5c.

Figure 6:
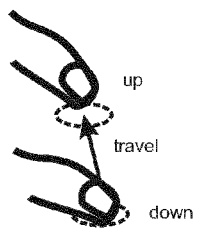
FIG. 6 illustrates the interaction of a finger with touch sensitive sensor means.

The conditions under which a key is adapted can vary. Preferably, whenever a touch Up event registered over a key, i.e., the corresponding target area is determined to have been hit by a detected touch event, see FIG. 6, said key is adapted. Alternatively, it can be demanded that the travel distance between the touch Down event, corresponding to a release of the hit target area, and the corresponding touch Up event over said key is smaller than a specified length. By doing so, inaccurate movements are not taken into account.

Preferably, an equalizing step is performed after each adaptation. Such a step should ensure harmonic geometric relations between key locations. Preferably, a mean value of all distances between target areas or keys is considered; then, the adapted key's distances to the other keys is measured. If one of said distances is smaller than the mean, it is moved back a certain amount: be V the vector from the new location (x',y') of adapted key k to its location before adaptation (x,y), i.e.: V=((x',y'), (x,y)); be m the mean distance between every 2 keys in the keyplane; then, for any real constant c, the location (x", y") of k after the equalizing step shall be (x', y')+c·V.

In a second preferred embodiment of the method according to the invention, the determination step 20 of the intended target area of detected touch location is achieved by further using a model of a user's hand. To that end, regions of said front multi-touch sensing means are associated to specific fingers of a user. Typically, regions in the top area of the lateral front edges of the device are associated to the left and right thumbs of the user. Similarly, regions along the lateral edges of the device are associated with the 4 remaining fingers of each hand. Further, a finger-to-key mapping is provided, which assigns a user's finger to a set of target areas or virtual keys, on both front and rear multi-touch sensing means. The virtual keyboard layout and the mapping are preferably chosen such that the finger-to-key mapping corresponds to the mapping that would be used while touch-typing on a regular physical keyboard.

First, the method determines which finger generated the touch event, based on the proximity of the detected touch event location to each of said regions. This allows to identify a set of possible target areas, which are mapped to the so-determined finger. A likely target area of said touch event is then determined among this set using the methods described earlier.

Further details of this embodiment are provided here below. The disclosed finger determination method may be readily used in use-cases which exceed the scope of the claimed invention. The algorithm may for example be used to identify intended key touches on a table-top surface computer or the like.

Figure 7A:
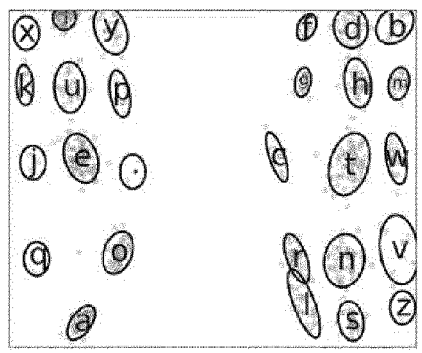
FIG. 7a illustrates key target areas learned from a user's touch locations in accordance with a preferred embodiment of the method according to the invention.

The approach uses machine learning methods to specifically address three kinds of variability: First, touch location distributions are modelled around touch targets, see FIG. 7a. Second, to account for ongoing changes in hand postures and finger placement behavior with keyboard updates, a hand model is used. Finally, the models are trained on user-specific touch data to respect variance between users.

Throughout the description of this embodiment, we assume a one-to-one mapping of keys to characters. Combined with the folded version of a known layout like QWERTY, this is argued to enable transfer of users' existing motor programs from physical keyboards. This also defines the prediction task; each touch (at x;y) must be mapped to a character.

The approach according to the invention models keyboard, hands and language. The virtual keyboard model personalizes key locations and sizes based on the user's touch distributions. Matching virtual keys or target areas with the user's personal touch behavior can be expected to improve classification. Related prior art work on personalized key-targets for soft keyboards mostly uses a Gaussian Bayes classifier. It models keys with (bivariate) Gaussian distributions, as justified by evidence for front screen interaction.

The hand model estimates finger locations from unlabelled touches and predicts which touch belongs to which finger. It supports keyboard adaptation when hand postures change during typing. This dynamic adaptation improves touch classification. In general, adapting classifiers to varying user behavior requires new training data, ideally in each session. This may be unacceptable to the user. Related work on soft keyboards for mobile devices has proposed to collect training data from free typing, using the current model's predictions to label the touches. However, this implies to trust the same model we want to update, which is inappropriate if we expect dynamically changing behavior. Another known approach is to train multiple supervised models in advance, then select the most specific one in each context to achieve adaptation. Unfortunately, such known methods assume discrete hand postures (e.g. one/two thumb), but typing postures on the back are continuous. According to the invention, it is proposed to provide a keyboard updating approach, which does not rely on labelled touches. It has two parts. First, touch-to-finger assignments from the hand model and knowledge about the layout (e.g. QWERTY) are used to cluster unlabeled new touches. Second, the optimal pairing of existing keys and new cluster locations are determined to update the virtual keyboard layout.

The Language context improves classification for ambiguous touch locations, because not all characters or input elements are equally likely to continue previously entered text. Language modelling has been used in previous work for soft keyboards to predict characters from both touches and language context. The approach according to the invention is two-fold. First, n-grams are used to improve key disambiguation during typing. Second, words are inferred from touch sequences with Hidden Markov Models (HMMs) and use dictionaries to correct them. Auto-correction is a common feature of modern devices.

A touch classifier can learn to statistically associate touch feature values (i.e. touch Up, touch Down, etc. . . . ) with target areas or virtual keys. It is trained on labelled touches, which means that the ground-truth key for each training touch is known. The trained classifier can then predict keys for future unlabelled touches. We use Gaussian Bayes, which models each key with a (bivariate) normal distribution, see FIG. 7a. This model is defined by Bayes' Theorem:

$$p(k \mid t) = \frac{p(t \mid k)p(k)}{p(t)} \quad \text{E.1}$$

$p(t|k) \sim \mathcal{N}(\mu, \Sigma)$ is the likelihood of touch t given key k. $p(k)$ models prior believe in k. $p(t)$ is a normalization factor for the set of all available keys or target areas K:

$$p(t) = \sum_{k \in K} p(t \mid k)p(k) \quad \text{E.2}$$

To train the model, the likelihood $p(t|k)$ is derived from all touches with label k: $\mu$ is their average location, $\Sigma$ is their covariance. The prior $p(k)$ is given by the relative frequency of characters in the language or training text. We propose to consider sparse training data. Keys for uncommon characters may have few training touches. This leads to poor estimates for their likelihood distributions $p(t|k)$. We solve this problem with a fallback to a default distribution. If there are less than minPoints (for example, 5 or more, alternatively 15 or more) training touches for a key k, the covariance matrix of $p(t|k)$ is not estimated from those touches. It is rather set to a default matrix with zero covariance and variance d. Thus, d defines a default key-size.

Figure 8:
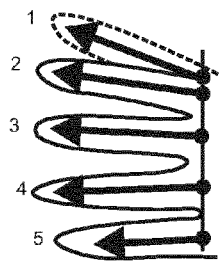
FIG. 8 schematically illustrates shows a rear touch sensor of a device according to a preferred embodiment of the present invention, including different tactile feedback regions.

We present a simple hand model for back-of-device typing. It uses a set of lines to represent possible fingertip locations for each digit finger. Line orientations and locations are learned from touches. As a result, our model captures location and rotation of the hand relative to the device. We use this context knowledge to facilitate keyboard updates while typing with changing hand postures. Each hand is represented by five straight lines. Each digit finger is modelled as one line, thumbs are not needed on the rear multi-touch sensor. However, the index finger gets two lines; it serves two rows of keys in the folded layout. The hand model $\theta$ is illustrated by FIG. 8 and defined as:

$$\theta = [\theta^i], \theta^i = (\theta_1^i, \theta_2^i)^T, 1 \leq i \leq 5 \quad \text{E.3}$$

$\theta^i$ defines the i-th line with intercept $\theta_1^i$ and slope $\theta_2^i$. Lines ordered vertically (FIG. 4b): $\theta^1$ and $\theta^2$ define the index finger, $\theta^3$ is the middle finger, $\theta^4$ the ring finger, $\theta^5$ the small finger.

To learn the parameters of the presented hand model, we have to fit finger-lines to touch locations. Intuitively, our method takes a first informed guess to place initial lines. They are then refined iteratively. Each iterative step has two parts. First, each touch is assigned to its closest line. Second, slope and intercept of each line are updated to fit the assigned touches. The algorithm terminates, when no more changes occurred.

The algorithm uses Expectation-Maximisation (EM) and is similar to k-Means. It is referred to as k-Lines in related work. A detailed description of our procedure is given below:

1. Initialisation:

Initial slopes are set to 0 (horizontal fingers). Intercepts are initialised with k-Means using only y-values of the touches. We define k lines $\theta^i = (c_i; 0)^T$. $c_i$ is the i-th cluster-mean of the k-Means clustering. Cluster-means are sorted to match the finger indices described for the hand model. Then, we start an EM loop with two iterative steps.

2. Fitting Touches to Lines:

The first step of each iteration assigns each touch $t = (t_x; t_y)^T$ to its closest line:

$$line(t) = \underset{1 \leq i \leq k}{\operatorname{argmin}} distance(t, \theta^i) = \underset{1 \leq i \leq k}{\operatorname{argmin}} \frac{|\theta_1^i + \theta_2^i t_x - t_y|}{\sqrt{\theta_2^{i2} + 1}} \quad \text{E.4}$$

3. Fitting Lines to Touches:

The second iterative step fits k lines to the touches, using linear regression with basis functions. We create a design matrix X and target vector y per line:

Let $T_i$ denote the set of all touches t assigned to the i-th line. The N×M design matrix $X_i$ for the i-th line is defined as:

$$X_i = [x_{nm}], x_{nm} = \Phi_m(t_n), t_n \in T_i \quad \text{E.5}$$

$\phi_m$ denotes the m-th of M basis functions. Each of the $N = |T_i|$ rows of $X_i$ contains one touch, each column one feature. For straight finger-lines, we set $\phi_1(t) = 1$ (bias) and $\phi_2(t) = t_x$ (linear term). The algorithm is flexible: Other $\phi$ and corresponding distance measures could model different assumptions, for example a quadratic component: $\phi_3(t) = t^2 x$. Next, $y_i$ is defined as the vector of the y-values of all touches $t = (t_x; t_y)^T$ in $T_i$. Finally, $X_i$ and $y_i$ are used with least-squares:

$$\theta^i = (X_i^T X_i + \lambda I)^{-1} X_i^T y_i \quad \text{E.6}$$

With $\phi_1$; $\phi_3$ as described above, $\theta^i$ represents a straight line with intercept $\theta_1^i$ and slope $\theta_2^i$. $\lambda$ penalises large $\theta$ and restricts the model to avoid steep slopes (indicate crossing fingers) and intercepts beyond the device borders.

Figure 7B:
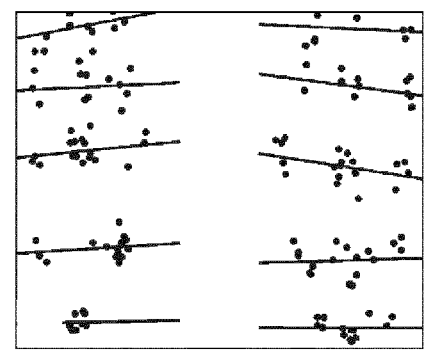
FIG. 7b illustrates lines representing a hand model computer based on a user's touch locations in accordance with a preferred embodiment of the method according to the invention.

4. Termination:

Steps 2 and 3 are executed repeatedly, until no further changes to the line assignments occurred since the last iteration. For physical finger assignments, simply merge the two clusters of the index finger lines. This completes the desired output of the algorithm—finger assignments and the final hand model $\theta$. FIG. 7b shows an example result.

Touch behavior of the same user can vary between or during typing sessions. A personalized keyboard model has to adapt its keys to these changes or the mismatch of old key locations and new touch locations will increase touch classification errors. Collecting new labelled data to retrain the model is not an option, because training phases interrupt the user. New touches from the user's ongoing free typing may inform the model instead, but they lack labels. Hence, it is unknown which touch should update which key. This problem is solved by a combination of keyboard and hand models in a clustering method. This allows to use unlabeled touches to update the keyboard and avoids to bother the user with new training phases. The approach has two parts. First, clustering finds unlabelled key-locations. Second, existing labelled keys are paired with the new locations. Then, each key is moved to its new location. Standard clustering methods (e.g. k-Means) cannot fully utilize context knowledge about layout and hands. Hence, we propose a custom hierarchical clustering algorithm:
1. Hands: If hands do not overlap, they are trivially given by the touches' relative locations to the device center.
2. Fingers: Our hand model is used to cluster touches of each hand by fingers. FIG. 1c) shows an example.
3. Keys: Touches of each finger are clustered into keys with k-Means, initialized with key-locations of the existing model.

The hand model enables the important second step; it allows to search for key-clusters per finger (step 3), not just per hand. The method needs at least one touch per key, because the number of clusters is fixed. This can be ensured by adding key-locations of the existing keyboard to the new touches. After clustering, each existing key is associated with a new cluster mean. The solution to this set-matching problem is a pairing which minimizes the sum of distances, as shown in FIG. 9

Figure 9:
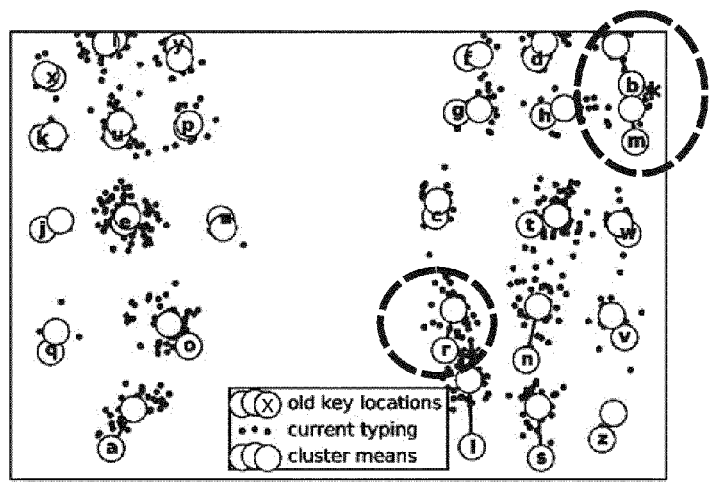
FIG. 9 illustrates the result of a key updating step according to a preferred embodiment of the invention.

Referring to FIG. 9, an existing virtual keyboard mapping is shown by labelled circles. It is updated by incoming unlabelled touches, represented by black dots. The cluster means as computed from these touches are shown as unlabeled white empty circles. They define the new or updated key-locations. The new key locations are labelled by pairing them with the old keys, minimizing the global sum of distances. The dashed circles highlight example which show the importance of an optimal pairing per finger. In these cases, simply assigning the closest of all old target areas or keys would have resulted in an error.

One may try all possible pairings or use the Hungarian Method as known from Kuhn in Naval Research Logistics Quarterly 2, 1-2 (March 1955). Fingers can be treated separately. Each key is then moved to its corresponding cluster mean. Updates can be scheduled regularly during typing. For example updates may be performed at the ends of sentences. The updated model is then used to classify future touches—until its next update.

In case of ambiguous touch locations, language properties can help to infer user intention. Language models can thus complement models of touch behavior. This is valid for all disclosed embodiments. A language model is stored in the database accessible by the method and device according to the invention. The model preferably consists of at least the following modules:

A dictionary of existing words in the currently active languages, if available and maintainable in the database.
   Frequencies of word n-grams in the currently active languages. This list relies on the dictionary.
   Frequencies of letter n-grams in the currently active languages. This model is available for most languages.

All aspects of the language model are preferably updated while the user is typing in the productive (i.e. normal typing use) use-case, to match said user's personal language use. The stored interaction history may be used to build a user model, which can be consulted during typing in the productive use-case. Invocation is recommended as follows. The user's language model should be integrated in the global language model, e.g. by adding instances of (character and word) n-grams to the language model database. It is recommended to weight the user-specific data higher than the global data.

The weight of the language model in the target area determination step is preferably dependent on the plausibility of the classification.

It is proposed to use n-gram models, Hidden Markov Models (HMMs) and dictionaries. Relationships between words here (e.g. word n-grams) are not taken into account in this embodiment. We use character n-gram models as priors like related work to predict $p(k_n)=p(k_n|k_1, k_2, \ldots, k_{n-1})$, the probability of key $k_n$ given the last n−1 predictions $k_1$, $k_2, \ldots, k_{n-1}$. The Bayes model combines this with the touch likelihood $p(t|k_n)$:

$$p(k_n | t) = \frac{p(t | k_n)p(k_n | k_1, k_2, \ldots, k_{n-1})}{p(t)} \qquad \text{E.7}$$

Training is the same as before. The n-gram model itself is trained on a large text corpus.

It is also proposed to use word evaluation, which resembles autocorrection: HMMs extend the Bayes model with state transitions to find the most likely state sequence (word), given the observation sequence (touches). An HMM model $\lambda=(A;B;\pi)$ is set up with known information. Initial probabilities $\pi$ are character frequencies of the language (unigram model). The transition matrix A is given by a bigram model. Emissions B are the likelihood distributions $p(t|k)$ from the Bayes model. In addition, dictionaries can correct mistyped or misclassified words. Large training text is used to suggest candidates, which are ranked by similarity to the input. We further rank equally similar candidates by touch probability, not by training text frequency. The input is then corrected with the best candidate.

In what follows, a further preferred embodiment of the method according to the invention is described, wherein preferred implementations are given by way of example only, without restricting the scope of protection of the invention in any way.

In this embodiment, the method is carried out on a tablet computer having a front screen which is multi-touch enabled, and having a rear face that comprises a touch-sensitive surface. At least parts of the front and rear face touch sensing elements are used as an interaction surface for text entry. The display may be used to provide visual feedback of the part of the virtual keyboard layout, which maps areas of the rear face sensor to virtual keys.

The visualization of a touch t on the rear sensor should reflect the properties of t; for instance, the touched area should be expressed as actual area, the pressure exercised by the touch can be mapped onto the brightness of the visualization. Obviously, the location of the touch should be directly reflected on the projection: t.loc=(x,y) should generate a visualization at (x,y).

It is recommended that touch events on the backside are translated into the graphical representation's coordinate system. For instance, if exactly one backside touch panel is used, that offers a resolution of 4000×4000 units, and the front side has a display offering a resolution of 1280×800 pixels, the front side touch events go with their "natural" location coordinates, while backside touch events' location coordinates are transformed: be t'.loc=(x',y')∈([0 . . . 4000], [0 . . . 4000]) the "natural" location of a touch t' on the backside rear side touch sensing means, the corresponding touch t has to be registered with location t.loc=(1280−(x'/4000*1280), (y/4000*800)). Note that x is mirrored; this is to make the locations of front and back side coincide so that a touch in the backside is projected to the spatially closest spot on the front side (from the user's view, the projection is "over" the finger in real-world space). In this preferred embodiment, both touches and target areas or virtual keys are displayed on the front side at such a location. When using remote or external displays to show a graphical representation or projection of the virtual keyboard layout mapping, there is a straightforward mapping of coordinates, so that, for example, the display shows movements toward the same direction so that the user perceives them as toward the same direction on the front side of the used device. The mapping of the graphical representation is illustrated by FIG. 14.

Multiple backside sensors on the text entry device are handled accordingly, e.g. by swapping horizontal and vertical coordinates in the "wing" embodiments with two backside sensors.

Virtual keys can be displayed in any form that seems suitable, e.g. as circles or polygons which may or may not intersect, and may or may not consume the whole interaction surface of the touch sensing elements; or dots indicating the locations of past touches over that key. Preferably, keys are displayed as an arrangement of UI elements depicting the according keys, which coarsely resemble the areas of the touch sensing means that are mapped onto that key. It is suggested that the keys are color-coded to reflect which key is meant to be operated by which finger. Representations of groups of keys can be used to represent the current keyplane, i.e. virtual keyboard layout mapping.

Besides the graphical representation selectively shown on a display, other kinds of feedback are suggested. Especially short vibration or other tactile feedback can indicate certain events that are decisive for recognition, e.g. a touch Up on certain keys.

The notion of a keyboard level is used to define several virtual keyboard layout mappings that share the same spatial assignments, i.e. key locations, but that assign different input elements to these keys depending on the context of the application or the toggling of a modifier key. Referring to well-known physical keyboards, a default keyboard layer maps the keys to lower case characters, while the Shift modifier selects a keyboard layer which maps the same keys to upper case character. It is suggested that many keyboard levels are predefined, and that a software provides a selection of these keyboard levels so that the most relevant keyboard levels for the current interaction context are easily accessible. For example, during text entry into a regular text entry field in an app or on a web form, the keyboard levels "lowercase", "upper case" and "digits and frequent symbols" are made easily accessible, by any means defined below. Furthermore, it is suggested to provide specialized UIs to the user in the same way keyboard levels are.

A specialized UI could be a menu; i.e. a set of actions that can be executed at a given time. It is suggested that, at any time, when an app wants to show a menu, its menu items are shown so that they can be conveniently selected from the backside; especially, they should be placed in key locations of the current virtual keyboard layout.

It is recommended that the method according to the present invention is run as a service, to make the method generally available for running apps. A service is a piece of software which runs on an operating system in a way that is transparent to the user. The service may be invoked at any time by the user. On devices running the Android™ OS, it is recommended to provide the method as an Input Method Editor (IME), to make it available as a standard text entry means on said devices.

Figure 10:
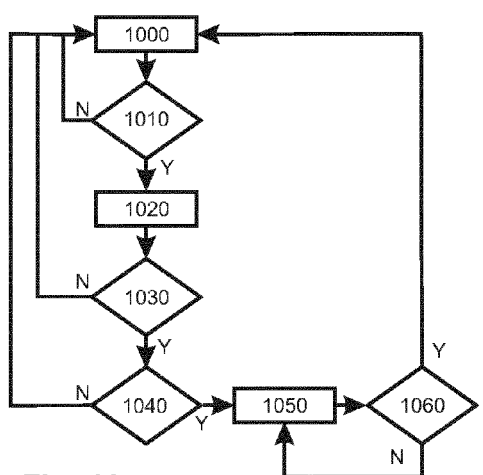
FIG. 10 is a flow diagram illustrating method steps involved in activating a service Mode in accordance with the invention.

Generally, users should be recognized and authenticated, so the system knows who currently interacts with it. This allows to select a stored virtual keyboard layout, which has previously been adapted to the user during one or more earlier typing sessions. To that end, following routine is recommended and illustrated by FIG. 10: an arbitrary signal (e.g. 8 simultaneous touches) is defined to switch from bypass (i.e. the service is not invoked) mode 1000 to typing mode 1050. When this signal is recognized 1010, user authentication starts 1020. It is recommended, that a secret password phrase is used for each user. As is custom, the password should match the stored password to authenticate the user. In case of no match 1030, the system returns to bypass mode. In case of a positive match 1030, additionally, touch data generated while entering the passphrase should be used to adjust the keyplane 1040. This can be done similarly to calibration, but also take into account typical distances between keys as hit by the user in question. These "typical" distances were previously stored in the interaction logs, and can also be used as an additional security measure; e.g., both passwords and typing characteristics must match to authenticate a user. If authentication is successful, the method according to the invention is invoked. A predetermined signal 1060 may be used to recognize that the user wants to stop using the service. Unless this signal is recognized, the service remains active and the method according to the invention is run. Other common user authentication triggers are encouraged, like RFID-based, or via an app's UI. It is encouraged to store the user data on a remote server, to make the profile available to the user on other devices.

A target practice app will generate or retrieve from previously stored typing sessions a virtual keyboard layout for a recognized user. It will then display a projection of keys and highlight them in a random or predefined (e.g. to train certain sequences) order; highlighted keys are to be touched, from the front or rear side, according to said key. Repeated use of this app will make the user's touch interaction more accurate, and thus easier to understand for the recognizer. The target practice app should store logs of all interaction of the recognized user, for statistical evaluations, and train especially those sequences with worst performance and accuracy on the user's part.

A phrase training app assists a recognized user in training the method as a text entry means, i.e., builds knowledge about which finger to use in which position (extended, relaxed, flexed), to effect a specific input element. The phrase training app should store a personalized model of each user, comprising at least their progress and their interaction logs. The phrase training app should offer predefined "lessons" containing phrases of at least the three categories: frequent n-grams of the targeted language, frequent words of the targeted language, and sentences containing 20-30 letters. This learning app shall make use of key highlighting and other projection features in beginner's lessons.

The app may in particular set up a virtual keyboard layout according to a calibration executed by the user. A stimulus (text) is displayed as part of the projection. The user is asked to transcribe said phrase. As the user transcribes the stimulus, the cursor moves through the phrase, indicating the next character to be typed; the target area corresponding to said character thus becomes the currently intended target area. The app measures the time needed for transcribing the stimulus phrase.

As a prerequisite carried out by the software, an initial virtual keyboard layout is built so that it maps regions of the touch sensing means (front and rear side) onto input elements, such as text characters.

It is preferred to use following interaction dynamics as a preferred scheme to utilize our method. The virtual keyboard layout is built so that it resembles a conventional (virtual) keyboard layout in a way that allows users to perform approximately the same finger movement while holding the device at its lateral edges, as they would when typing on a conventional desktop keyboard. To this end, a virtual keyboard of the size of a desktop keyboard is split in two keyboard halves; one left-hand half and one right-hand half; then, the two keyboard halves are translated and rotated onto the rear side so that the parts originally in the center of the keyboard appear conceptually in the upper part, the parts originally at the edge are mapped to the lower part of the rear touch sensor. Note that in this preferred embodiment, each digit finger operates a maximum of 3 keys, except for the index fingers, which operate 6 keys, 3 of which are accessible through stronger abduction of the index finger. The typist clasping the device can touch the rear sensing means of the device with any digit finger. Users touch the touch sensor in different locations depending on what finger they use, and how strongly flexed or extended the finger is when touching the sensor. Especially, three positions can be called out for each finger: flexed, relaxed, and extended. On a desktop keyboard, these three positions of a finger result in hitting different rows on the keyboard: bottom row (flexed), home row (relaxed), and top row (extended). By configuring the virtual keyboard layout as suggested in this preferred embodiment, the typist is enabled to hit the same keys for the same finger in the same location; for example, when employing the common QWERTY keyboard layout, the left middle finger will still be responsible for the same keys: "c" (flexed), "d" (relaxed), and "e" (extended). Allowing the same assignment facilitates positive transfer from a user's existing skills with a physical keyboard.

It is recommended that each finger in the backside operates not more than three locations (flexed, relaxed, extended). Therefore, some of the buttons of the regular keyboard cannot be mapped onto the virtual keyboard layout, e.g. the digits and symbols available in the row above the "top row". It is suggested that the input elements usually available over said inaccessible buttons are made available on alternative keyboard levels. Other input elements, especially those which are commonly not available on the desktop keyboard, can be mapped on any keyboard level, too.

Especially, the common QWERTY layout can be resembled by the layout. Alternatively, the (optimized for the English language) Dvorak DSK layout can be reflected. Alternatively, any existing or customized keyboard layout for any language can be resembled. We suggest that the primary keyboard level shall make accessible at least the lowercase letters and most frequent punctuation marks, especially the comma and the full stop.

The user will touch the backside touch sensor. Every location (x,y) on the rear side touch sensor is preferably mapped onto a target area or virtual key k. On each touch Up event, i.e. whenever a finger is lifted off the sensor, said key k is evaluated, and its associated effects are carried out. Touch Down events can have effects on the graphical representation feedback, like showing the key over which the touch event occurred, e.g. by showing the corresponding input in a dedicated area of the GUI. Considering only touch Up events for generating entry enables preparatory finger movement: typists, while touching the touch sensing means over a key, can already place the fingers over the next keys to press, without an unwanted effect carried out. During fast typing, it occurs that multiple fingers are touching the rear side sensing means simultaneously; in other words, several touch Down events are generated without touch Up events in between. Since touch Down events generate no input in this preferred mode of operation, the entry will be correct as long as the fingers are released from the surface in the correct order. Also, if only touch Up events generate input, a typist can correct their touch location between the touch Down and the touch Up event, to avoid an error. The GUI representation of the virtual keyboard layout can encourage this by exposing the key over which touch Down events occur.

Alternatively, only touch Down events can be considered for generating entry, rather than only touch Up events. For instance, the behavior of a physical keyboard can be emulated: after a certain delay after the touch Down event over a key, repeated entry of the input element assigned to said key can be generated, until the corresponding touch Up event arrives.

Furthermore, it is suggested that holding down thumbs on the front touch sensing means during execution of a touch on the rear side leads to a variation of the back side key mapping. Especially, holding down the left thumb while a touch is executed that usually leads to the input of a lowercase letter shall lead to the input of said letter's uppercase counterpart.

Users yet unknown to the system should get pre-formed virtual keyboard layout configurations; however it is preferred that these are adapted to the user's hand anatomy. The following scheme is recommended. The user measures the length m of their middle finger (from the head-base to the tip) and the approximate width w of said three fingers when not stretched away from each other. Each halves (i.e., the part of the keyboard layout for each hand) of the virtual keyboard layout should be setup in the following way:

Generate a reference location $C=(Cx,Cy)$. At this location, the middle finger's home row key will be placed (by its centroid, or nominal location). Consider the line L that marks the intended locations possible to touch as the user's middle finger's degree of extension/flexion varies; be V a vector on that line, whose foot is on C; V is parallel to L, pointing toward the extension (not flexion) direction; the length of V is $0.2 \cdot m$; place the location of the middle finger's top row key at $(Cx,Cy)+V$, its bottom row key at $(Cx,Cy)-V$; Be W a vector whose foot is equal to the foot of V; the direction of W direction is 90° against V (i.e., orthogonal to V, and pointing toward the index finger keys; W's length is $0.65 \, w$; place the index finger's home keys at $(Cx,Cy)-0.5 \, V+W$ and $(Cx,Cy)+0.5 \, V+1.8 \, W$; place the ring finger's home key at $(Cx,Cy)-0.5 \, V-W$, and the little finger's home key at $(Cx,Cy)+0.75 \, V-1.8 \, W$; place all remaining fingers's top row and bottom row keys analogously to that of the middle finger, but keep the distance between them and the home row key slightly smaller than for the middle finger, and even smaller for the little finger.

It is preferred to provide users with small physical objects (e.g., plastic knobs with adhesive bottoms) to mark certain key locations; said objects can be placed under the computed locations of the middle fingers' home row buttons (in the preferred mode employing the QWERTY keyboard, these would be the keys for "d" and "k"), to provide tactile feedback while the user is training to use the method. Additional keys can be marked thus, too. Additionally, self-adhesive very thin strips can be placed on the surface, to mark line segments between keys. Users shall decide for themselves which location L of the middle finger home row buttons is best for them. Then, the system can translate the above setup keyplane so that the keyboard halves match said locations; for each keyboard half, every key is translated by the same vector V that is defined to go from C to L. If the hardware affords dynamic tactile feedback, analogous haptic cues shall be created.

It is preferred that Interaction logs are stored in a memory element. The logs comprise interaction of specific users. They can help inform recognition, and allow for statistical evaluations of a user's performance and typing behavior.

It is recommended to use a database with at least the following data:

- Every letter n-gram entered (n≥4 recommended); this allows for later establishment of time intervals between the entry of letters (and thus difficult key locations), and n-gram frequencies in the user's personal vocabulary (used in recognition).
- every touch event, for later reconstruction of the virtual keyboard layout;
- the organization of the current virtual keyboard layout for the current user, for later reconstruction; the relative locations of keys to each other can be restored, either in full or to a degree, after the keyboard layout was set.

Calibration is an action where the user puts multiple fingers on the rear touch sensing means at once, to inform the recognizer about 1) their intention to start using the system, and 2) their current hand posture.

When calibration is detected, the system preferably executes an algorithm to (re-)organize the virtual keyboard layout according to the recognized hand posture, by placing the keys to according (nominal) locations. Afterwards, the system can switch to typing mode.

The following algorithm describes how calibration can be detected.

Let the following be defined for the remainder of the document:
N:=number of fingers to operate the current keyplane;
XH:=horizontal resolution of the touch panel (as given by driver software and OS), divided by 2;

In the preferred embodiment, calibration is indicated by the user when they touch the rear side touch sensor using N digit fingers. The following algorithm is recommended for the preferred embodiment with N=8:

```
#START
Generally, keep track of all fingers touching the rear sensor (i.e.
between touch Down and touch Up), at all time, and store them into T;8
Whenever #(T) = N:
   left := 0;
   right := 0;
   foreach t ∈ T:
      if t.loc.x < XH:      left := left + 1;
      else          right := right + 1;
   if left = right = 4:
      create set T' with all touches' locations
      T" = { }
      Ignore = { }
      at every touch Down event t: store t.id in Ignore
      at every touch Up event d with d.id ∉ Ignore: store d.loc into T"
      when #(T) = 0: register calibration gesture with the touch Down
locations T' and the touch Up locations T"
#END
```

The software then reorganizes the keyboard layout according to the sets T' and T", as disclosed below. On the preferred embodiment, the device is clasped at the lateral edges. Therefore, the touches can be sorted by the y-coordinate of their locations. On other embodiments, finger distinction might be more difficult.

It is recommended to give, as tactile feedback, a special signal (e.g. a longer than the usual vibration signal) to indicate that calibration has been recognized.

For other embodiments, similar algorithms can be found accordingly: on wearable sensors, typically #(T)=5 will be demanded, or #(T)=10, if two sensors for each 5 fingers are considered together. To determine fingers, users can be asked to put their fingers onto the rear touch sensing means in a specified order.

For the preferred folded keyboard layout, there are 3 "keyboard rows", which correspond to the finger postures (flexed: bottom row; relaxed: home row; extended: top row). During calibration, for each finger the following shall be done: consider the (Euclidean) vector between the touch Down and the touch Up event; compute the center c of said vector V; consider the Vector W from the current location of said finger's home row key to its top row key; compute the arithmetic mean a between the length of said vector W and the distance between the touch Down event's location and the computed center c; put the home row key's centroid and the vector W's foot onto c without rotating it; scale the W to the length a, and put the top row key's centroid onto the head of W. As more data from a user is collected, a can be replaced by another ratio of W. Do analogously for the bottom row, wherein W is scaled to −a for this step.

If the mean of all distances between the touch Down and the corresponding (same id) touch Up events is below a certain threshold, do not compute any vectors, but just translate, for each finger, the three keys so that the home row key is under the finger, and translate the other two buttons so that their original distance and angle is retained. Alternatively, the virtual keyboard layout setup step for new users can be employed.

Special constraints can be set during runs of the phrase training app. While the user is transcribing a stimulus phrase, the system knows, at all time, the intended input elements to produce, e.g. the character at the stimulus cursor. Adaptation can be done as follows, with reference to the adaption formula given earlier: $k':=k+c(t.loc-k)=(k.x+c(t.loc.tx-k.x), k.y+c(t.loc.ty-k.y))$:

- In a "strong adaptation" mode, after each typed character, the intended (known by means of the stimulus phrase, this is not necessarily the hit key) is moved toward the touch (e.g., c=0.25), except if the Euclidean distance between the touch and the key exceeds a preset maximum, or a key was hit that is meant to be hit using the other hand. This mode is suitable to configure the virtual keyboard layout for an unknown user.
- In a "weak adaptation" mode, after a key h was hit when a key k was intended:
  if h=k, then k will be moved toward the touch (e.g. c=0.25);
  otherwise, no key will be moved; alternatively, h can be moved away from the touch (e.g., c=−0.17), to resolve cluttered keys;

In the productive use-case, the intention of the typist is not known beforehand, as it is during training. It is therefore recommended to maintain a history of adapted keys, i.e. store their centroids in an array. When an entered input element which caused adaptation gets corrected afterwards (by backspacing), the adaptation can be undone by restoring the stored centroid position. While undoing, the used centroid is removed from the history; thus, multiple adaptation processes for the same key can be undone when appropriate.

Users can be encouraged to "manually" rearrange keys, e.g. by dragging the key (by its projection) around in direct manipulation.

On sensor-controller-driver combinations which deliver approximate contours of the parts of fingers that are hovering over the touch sensing means, "keyboard rows" (i.e. degree of flexion/extension of a finger) can be inferred more robustly, e.g. thus:

The fingertip location is established using conventional computer vision algorithms. The respective length of the part of a finger hovering over the surface is taken as reference to infer the degree of flexion and extension of said finger. Key locations are adapted to the finger; especially, a line segment between the top-row and the bottom-row button of each finger is considered; said line is rotated and translated to match the contours of the recognized finger; then, the keys are placed accordingly to their original relative location to said line segment.

It is recommended to use these advanced sensors in combination with resistive touch sensors, in order to get exact instant and location of the touch. Said location shall be checked against the computer vision derived information (to verify the touching finger), and forwarded to a concurrently running (adaptive keys or machine learning) recognizer, based on the key locations derived from above algorithm.

FIG. 12 illustrates a device capable of carrying out the method according to the present invention. In the depicted preferred embodiment, the device 200 comprises at least one multi-touch sensing element 210 on its front face, while it comprises at least one further multi-touch sensing element 220 on its rear face. Preferably, the form factor of the device is that of a slate or table computer. It is essentially flat and has the general contours of a rectangle. The device comprises computing means 230 such as a central processing unit, CPU, and at least one memory element 240, to which the computing means have read/write access. The sensing means 210, 220 are operatively connected to the computing mean 230, so that the latter may use the input provided by the former. The computing means are configured to implement the method steps according to the invention.

Preferably the device further comprises a screen on its front face, with which the front sensing means 210 are collocated as known in the art. A tablet computer may be both the source (receiving and processing the touch input) and target (receiving the inferred input elements) of the interaction. Users will input information into the target via touch interaction on the source's touch sensing means. In alternative embodiments of the device, the source, i.e. the computer on which text is entered is a separate entity from the target, which is computer in communication with the source. In another alternative, computer systems interposed on a communication link between the target and source devices may be operates as further targets, or as means do display visual feedback relating to the text entry process that is operated on the source device. This situation is illustrated in FIG. 14, where a touch event on the rear surface 120 may be displayed on the front display 160 of the device 100, or alternatively on the display of a target device A. The target device may receive the display information from the device 100 via an intermediate device B.

As a further embodiment, it is recommended to attach multi-touch sensing means in the rear side of a netbook's, notebook's or laptop's hinged display panel, and combine this with a front side multi-touch sensor that is collocated with the display.

Known multi-touch sensors, i.e., surfaces that can robustly track multiple fingers as they touch and move over the sensor are well known in the art. The touch surface can be physically built into one sensor, or comprise an array of single touch sensors. By known measures (touch data interpolation), the spatial sensor resolution can be enhanced beyond the array size, so a relatively small number of arrays (e.g. 8 times 8 sensors) can be sufficient for a "virtual" resolution that allows for interaction in accordance with the present invention. The technology underlying the sensor (array) can vary; also, the sensors may be arbitrarily shaped, and deployed in different forms.

Possible embodiments that provide the functions required by the device 100 according to the invention comprise but are not limited to:

- projected capacitive multi-touch sensors, preferably utilizing mutual capacitance, commonly produced as double-layer glass panels or built into mobile devices; these sensors are preferred, as they offer good spatial and temporal resolution; also, they can be configured ("calibrated") to sense proximity; it has been shown that finger contours can be detected using this technology;
- resistive touch and multi-touch sensors;
- shaped, and potentially conformable, units containing arrays of capacitive (touch and approximation) or resistive (touch and force) sensor elements, made of conductive metal plates, conductive foam, conductive yarn or other materials;
- textile cloths with woven conductive yarn;
- optical, e.g. infrared-grid;
- sonic, e.g. surface acoustic wave;
- computer-vision driven sensors, as deployed in some multi-touch tables, supported by, e.g., FTIR;
- camera-based sensors for localizing fingers;
- any combination of the above so that components contribute that sensor information which they can deliver best; especially:
  - a unit of a projected capacitive touch sensor configured to detect proximity in combination with a resistive touch sensor which is capable of detecting proximity and/or force; the capacitive sensor contributes finger contours, while the resistive sensor contributes an exact timestamp and location of a touch.
  - a unit of a projected capacitive touch sensor configured to detect proximity in combination with a gyroscope, acceleration or auditive sensor (sensors of the target device can be used, if the recognizer runs on that target); latter sensors shall contribute timestamp and force of contact between finger and sensor surface;
  - a combination of light-based or FTIR or RD with microphones placed beneath the surface of a large interactive area; first sensors contribute exact location, latter sensors contribute instance and force of contact between finger and sensor surface;
- any other technology known in the art capable of multi-touch or finger tracking.

The sensors can be arbitrarily shaped, especially:
- flat, e.g. if built into a tablet's rear side, or if embodied in a peripheral appliance to be connected to a tablet computer;
- curved to match the operational area of fingers, especially when the hands' palms are fixated relative to the appliance;
- curved to match human anatomy, e.g. forged into a bracelet of arbitrary but sufficient size for any keyplane structure;
- conformed to objects, e.g. furniture;
- conformable to attach to clothing or objects;

There exist known hardware systems that allow for dynamic tactile feedback, which means that the touch panel area can be augmented with tactile cues that can be manipulated algorithmically to appear in desired locations and produce different kinds of tactile sensation. It is preferred to deploy this technology in any embodiment if possible, in order to create haptic feedback that guides the fingers of users while operating, especially in the rear side. The technology may vary; preferable are systems which change the shape of the sensing surface; alternatively, electric or sonic systems may be used; however, they require a finger to glide over the surface in order to give feedback. Certain richness of the tactile channel can be achieved by building an array of actuators (e.g. vibration motors) into conformed or conformable sensor surfaces.

Assuming that the haptic cues generated can be arbitrarily shaped with sufficient spatial granularity, it is recommended that the structure of the sensing surface is augmented as follows:

There should be tactile feedback in an area around the sensing means' location of certain or all keys. Quality, shape and size of said area should vary, if possible, depending on the properties of a key, at least: finger associated with said key, finger posture (degree of flexion/extension) intended for said key.

Between keys or target areas, there should be line or curve shaped areas sporting tactile feedback, to inform users when they are touching between certain keys; especially keys associated to the same finger or belonging to the same degree of flexion/extension can be connected thus. Preferably, the quality of the feedback should be distinguishable for the user from the tactile feedback over key locations.

Figure 11:
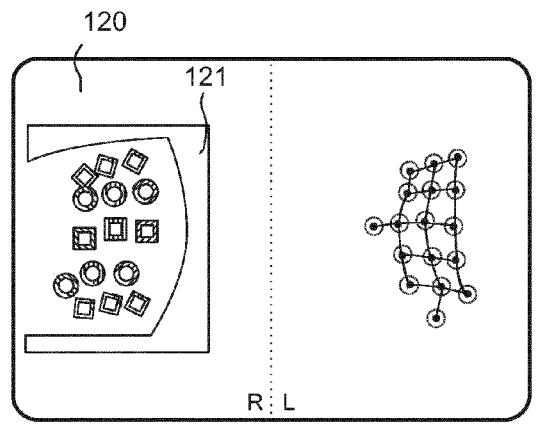
FIG. 11 illustrates a front view of a preferred embodiment of the device according to the invention, including a graphical representation of a virtual keyboard mapping.

FIG. 11 shows a rear face multi-touch sensor 120 of a device according to the invention. Different haptic cues are provided as an example for the areas on which the right and left hands operate. While in this example, the locations of the target areas are circles, the haptic feedback may be provided by dots (left hand) with connections between them allowing a user to sense the distances between keys. Alternatively, different key rows may be identifies (right hand) by different shapes of different roughness. The borders of the keyboard may also be provided by haptic markers, as indicated by the inverse C-shaped structure 121 for the right-hand part.

The invention teaches preferred use of a device with at least 2 touchable areas, called the front side and the rear side, of an appliance. In this preferred way, the thumbs operate on the front side, the digit fingers operate on the back side. The device is preferably clasped using both hands at its lateral edges, so that the palm of the hand can fixate the device, using a little pressure; at the same time, the device is held so that its weight is supported by the palms of the hands; this use allows for a safe and comfortable hold on the device, while retaining most of the digit fingers' movability for touch interaction on the rear side touch sensing means.

The rear side sensor area can consist of one, several or many sensor elements. An embodiment using only one sensor area insists that the sensor affords multi-touch for n>1 or 2. Using several multi-touch sensor elements would allow for easy modification of the shape of the interaction area in the backside. For instance, using two multi-touch displays allows for a configuration of the device where the sensors can be in one of at least the following configurations:

flat, so they will not change the form factor of the device and allow the user the most intuitive interaction with front side objects.

"flapped out", like wings, i.e., form an angle between themselves and the tablet plane, to be reachable easier, and to allow for a different projection angle to the front side, which can, for example, make the more central regions of a tablet reachable;

It is recommended to implement a comfortable way to switch between these two configurations, e.g. in the fashion of a bathroom closet door, where a gentle inwards push will effect an outwards movement, caused by a spring. Preferably, the angle can be adjusted, e.g. by means of a built in resistance in the angle of the "wing". Such an embodiment is depicted by way of example by FIGS. 13a and 13b.

Using many sensor elements, e.g. laid-out in a grid structure of x*y sensors can allow the use of inexpensive capacitive touch sensors, each of which would not have to be a multi-touch sensor. So built sensor areas with many sensing elements can be connected to a digital signal processor which computes the touch locations from the "raw" sensor data from the touch sensor element array.

In a preferred embodiment, the device is a tablet computer with built-in capacitive multi-touch sensors in both the front and the rear side. Both sensors can robustly track at least 2 fingers simultaneously, without "ghosting".

In this preferred embodiment, the tablet's computing infrastructure can be used for all parts of the system; so, the tablet becomes the source of text entry and the target in one. However, the device might send information to an external target device, making the latter into a monitor for the GUI representation, or into another target device. To that end, the device according to the invention also includes communication means such as a serial port or a wireless connection device, which allows to transmit entered input elements to a target device.

In an alternative embodiment, the (source) device is a hardware device that basically resembles a flat screen embedded in a case with a bezel containing at least the touch panel controller(s), and a computing system running at least the touch panel drivers and facilities to send information (wireless and/or via cable) to an external computing system. Preferably, the built-in computer runs the software which implements the method according to the present invention, and which drives the communication facilities. Preferably, this embodiment also has front screen touch sensors or buttons for thumb interaction, and a display to show the projection. This embodiment's 300 backside can have flat or "flappable" wings 320 as depicted in FIGS. 13a and 13b. This embodiment may also contain filling material to give the device some physical volume.

Another embodiment attaches consumer-level touchpads 420, to the backside of a tablet computer as shown in FIG. 13c. Such trackpads typically communicate via Bluetooth™ with a computing device, which can, via a driver software, read touch data and feed it into a recognizer.

A similar embodiment would be shaped to conform to human hands, especially concave halves in the backside sensing means, to enable comfortable touch interaction by the digit fingers; similar adaptations for the thumbs are possible.

Generally, each sensor area of every embodiment can be designed to be flat, to keep the impact on the device's dimensions as low as possible, or "flappable", or curved, to conform to human hand anatomy and/or provide a more ergonomic or convenient (touch) operation and safe grip on the device. Another embodiment consists of two similarly dimensioned or equal touch-enabled mobile devices to each other, backside to backside, preferably using double-sided glue tape, or ceramic foil. One of the devices can then serve as the backside touch sensor. Both tablets should communicate via Bluetooth™ or a soldered USB connection.

In yet another embodiment of the device as shown in FIG. 13d, one rear multi-touch 520 sensor is embedded into the rear side of a hardware appliance featuring at least graspable lateral edges that are preferably curved and possibly soft, and feature, on the front side, a mount for a mobile device, e.g. tablet, smartphone or PDA. The mount can be made using flaps and/or wings and/or magnets and/or gluing elements, such as ceramic gluing foil. Additional to that mount, the front side may sport touch sensors or buttons to be operated by the user's thumbs.

In another embodiment of the device, a third-party multi-touch sensor panel, like commonly used for kiosk systems is attached, using regular or double-side-glued tape, or ceramic glue foil, to the backside of a MD, and a connected microcomputer runs both the drivers for the touch panel and either the software according to the invention, which further communicates the touch data to a remote computing system.

For all embodiments that are clasped at the edges, it is recommended to use a soft or rubberlike material, and form round edges, to avoid strain of the hand's skin.

Generally, all of the components of the hardware: front side, rear side, display, as well as external computing systems, are arranged so that they can communicate with each other. Especially, every embodiment as a unit can communicate with external computing systems. Said external systems can be connected to a display and thus serve as an interaction monitor. Also, they might be targets of the interaction, e.g., the computing systems into which the provided input elements shall be entered.

Preferred ways to communicate are cables (USB, I2C, soldered or other cable connections) or wireless communication for devices that are built into any setup. Wireless communications are preferably realized using Bluetooth™, Peer-to-peer-WiFi (sometimes "WiFi Direct™"), and regular WiFi™, if necessary with an interposed computing device in the local area network (LAN), the wide area network (WAN) or the Internet; if necessary, further computing devices in the LAN or Internet can be interposed.

It should be understood that the detailed description of specific preferred embodiments is given by way of illustration only, since various changes and modifications within the scope of the invention will be apparent to those skilled in the art. The scope of protection is defined by the following set of claims.

The invention claimed is:

1. A method for providing touch input at a handheld computing device, wherein the device is provided with at least one multi-touch sensing means on its front face, and with at least one multi-touch sensing means on its rear face, wherein the method comprises the steps of:
   providing, at the device, a virtual keyboard layout, which maps at least one first target area of said rear face multi-touch sensing means to a first predetermined input element, and at least one second target area of said front face multi-touch sensing means to a second predetermined input element;
   associating regions of said front and rear face multi-touch sensing means with specific fingers of a user;
   providing, for said virtual keyboard layout, a finger-to-key mapping which assigns a user's finger to a set of target areas on the multi-touch sensing means;
   detecting, at the device, the location of at least one touch event on said multi-touch sensing means;
   determining, at the device, a likely target area of said touch event on the virtual keyboard layout; wherein said determination further comprises:
   determining which finger generated the touch event, based on the proximity of the detected touch event location to said regions, which are each associated with a specific finger; and
   determining, among the set of target areas which are mapped to the determined finger, a likely target area of said touch event on the virtual keyboard layout;
   storing, at the device, the detected touch event location and the corresponding determined target area; and
   updating the virtual keyboard layout, wherein the location or shape of said area is adapted based on the detected touch event location.

2. The method according to claim 1, wherein said determination step comprises:
   selecting the target area of the virtual keyboard layout, whose centroid location has the shortest Euclidian distance to the detected touch event location.

3. The method according to claim 1, wherein said determination comprises:
   selecting the target area of the virtual keyboard layout based on its likelihood, wherein said likelihood is a function of the Euclidian distance between the target area's centroid location and the location of the detected touch event.

4. The method according to claim 3, wherein the likelihood of a target area is further a function of the number of occurrences in which the target area has been previously determined given previous touch events on said location.

5. The method according to claim 3, wherein the likelihood of a target area is further a function of the target area's associated input element's probability given previously determined target areas.

6. The method according to claim 1, wherein said updating comprises:
   moving the location of the determined target area towards the detected touch event location.

7. The method according to claim 1, wherein said updating comprises:
   moving the location of the determined target area toward the centroid of all or part of the previously detected and stored touch event locations, for-which the same target area has been determined.

8. The method according to claim 1, wherein the device is further provided with display means on its front face, and wherein the method further comprises:
   selectively displaying a representation of the virtual keyboard layout corresponding to the rear multi-touch sensing means at said front display means.

9. The method according to claim 8, wherein the method further comprises:
   selectively displaying a representation of a detected touch location on the rear multi-touch sensing means at the front display means.

10. The method according to claim 1, wherein the virtual keyboard layout maps a set of target areas on the left and right sides of the rear face to text character elements, so as to provide a folded keyboard layout, which can be touched using fingers of the left and right hands respectively.

11. The method according to claim 1, wherein said detected touch events comprises touch "up", touch "down", or touch gesture events.

12. The method according to claim 1, wherein the method further comprises:
   providing the associated predetermined input element into an input memory buffer of the device, after the target area has been determined.

13. The method according to claim 1, wherein said detecting, determining, and updating are repeated to adapt the location of said target areas to a user's handling of the device.

14. A handheld computing device comprising:
- at least one multi-touch sensing means on its front face, and at least one multi-touch sensing means on its rear face;
- a memory element and computing means, wherein the computing means and memory element are configured for:
  - providing, a virtual keyboard layout, which maps at least one first target area of said rear face multi-touch sensing means to a first predetermined input element, and at least one second target area of said front face multi-touch sensing means to a second predetermined input element;
  - associating regions of said front and rear face multi-touch sensing means with specific fingers of a user;
  - providing, for said virtual keyboard layout, a finger-to-key mapping which assigns a user's finger to a set of target areas on the multi-touch sensing means;
  - detecting the location of at least one touch event on said multi-touch sensing means;
  - determining a likely target area of said touch event on the virtual keyboard layout; wherein said determination further comprises:
    - determining which finger generated the touch event, based on the proximity of the detected touch event location to said regions, which are each associated with a specific finger; and
    - determining, among the set of target areas which are mapped to the determined finger, a likely target area of said touch event on the virtual keyboard layout;
  - storing the detected touch event location and the corresponding determined target area in said memory element; and
  - updating the virtual keyboard layout, wherein the location or shape of said area is adapted based on the detected touch event location, and storing said updated virtual keyboard layout.

15. The device according to claim 14, wherein the computing means are further configured to select the target area of the virtual keyboard layout, whose centroid location has the shortest Euclidian distance to the detected touch event location.

16. The device according to claim 14, wherein the device further comprises:
a display on its front face, with which said front multi-touch sensing means are collocated.

17. The device according to claim 14, wherein the device is a tablet computer.

18. The device according to claim 14, wherein said rear multi-touch sensing means are removably attached to said device.

19. The device according to claim 14, wherein said rear multi-touch sensing means are arranged substantially along the lateral edges of the device, and extend towards the middle of the rear face.

20. The device according to claim 14, wherein said rear multi-touch sensing means cover substantially all of the rear face.

21. A computer provided with at least one multi-touch sensing means on its front face, and with at least one multi-touch sensing means on its rear face, and capable of carrying out a method comprising:
- providing, at the computer, a virtual keyboard layout, which maps at least one first target area of said rear face multi-touch sensing means to a first predetermined input element, and at least one second target area of said front face multi-touch sensing means to a second predetermined input element;
- associating regions of said front and rear face multi-touch sensing means with specific fingers of a user;
- providing, for said virtual keyboard layout, a finger-to-key mapping which assigns a user's finger to a set of target areas on the multi-touch sensing means;
- detecting the location of at least one touch, event on said multi-touch sensing means;
- determining a likely target area of said touch event on the virtual keyboard layout wherein said determination further comprises:
  - determining which finger generated the touch event, based on the proximity of the detected touch event location to said regions, which are each associated with a specific finger; and
  - determining, among the set of target areas which are mapped to the determined finger, a likely target area of said touch event on the virtual keyboard layout;
- storing the detected touch event location and the corresponding determined target area; and
- updating the virtual keyboard layout, wherein the location or shape of said area is adapted based on the detected touch event location.

* * * * *